Aug. 8, 1933.                T. JENSEN                1,921,973
                          GARDEN IMPLEMENT
            Filed May 21, 1932              2 Sheets-Sheet 1

Inventor
Thorvald Jensen,

By *Clarence A. O'Brien*
Attorney

Aug. 8, 1933.　　　T. JENSEN　　　1,921,973
GARDEN IMPLEMENT
Filed May 21, 1932　　2 Sheets-Sheet 2

Inventor
Thorvald Jensen,
By Clarence A. O'Brien
Attorney

Patented Aug. 8, 1933

1,921,973

UNITED STATES PATENT OFFICE 1,921,973

GARDEN IMPLEMENT

Thorvald Jensen, Wetaskiwin, Alberta, Canada

Application May 21, 1932. Serial No. 612,777

1 Claim. (Cl. 97—66)

The present invention relates to garden implements and has for its primary object to provide, in a manner as hereinafter set forth, a device of this character which is in the nature of a combined rake and cutter.

Other objects of the invention are to provide a garden implement of the aforementioned character which will be simple in construction, strong, durable, efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
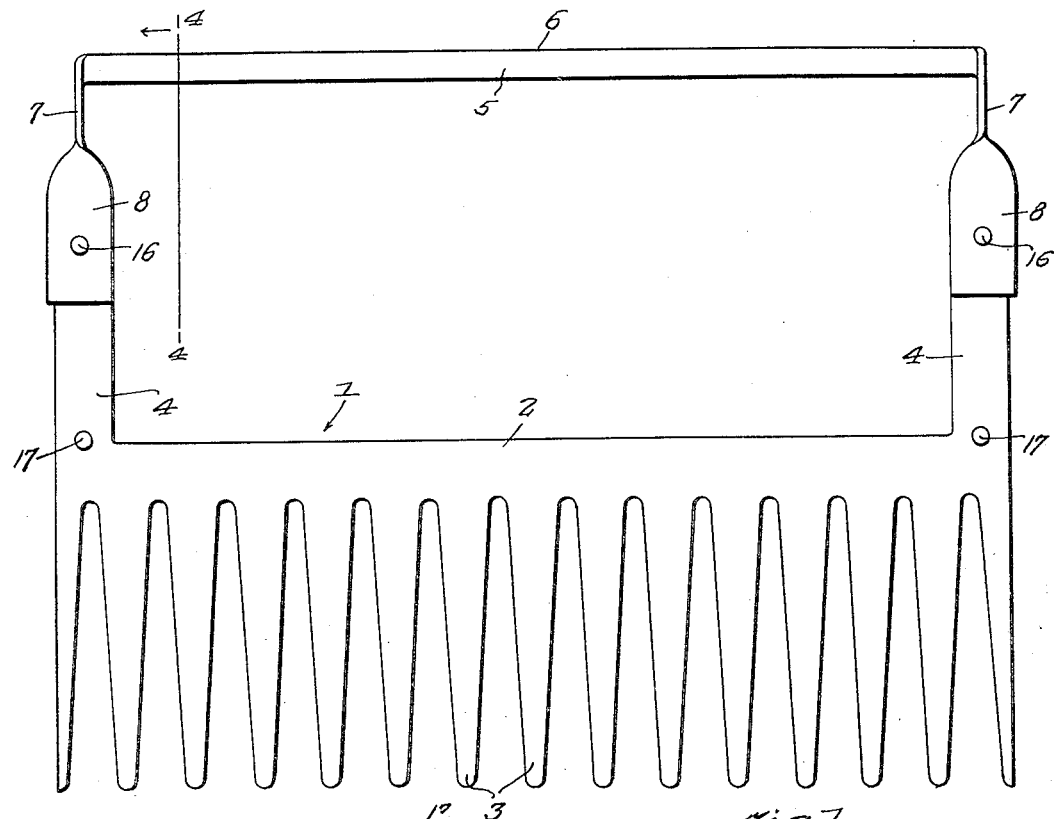
Figure 1 is an elevational view of an implement in accordance with the present invention.
Figure 2:
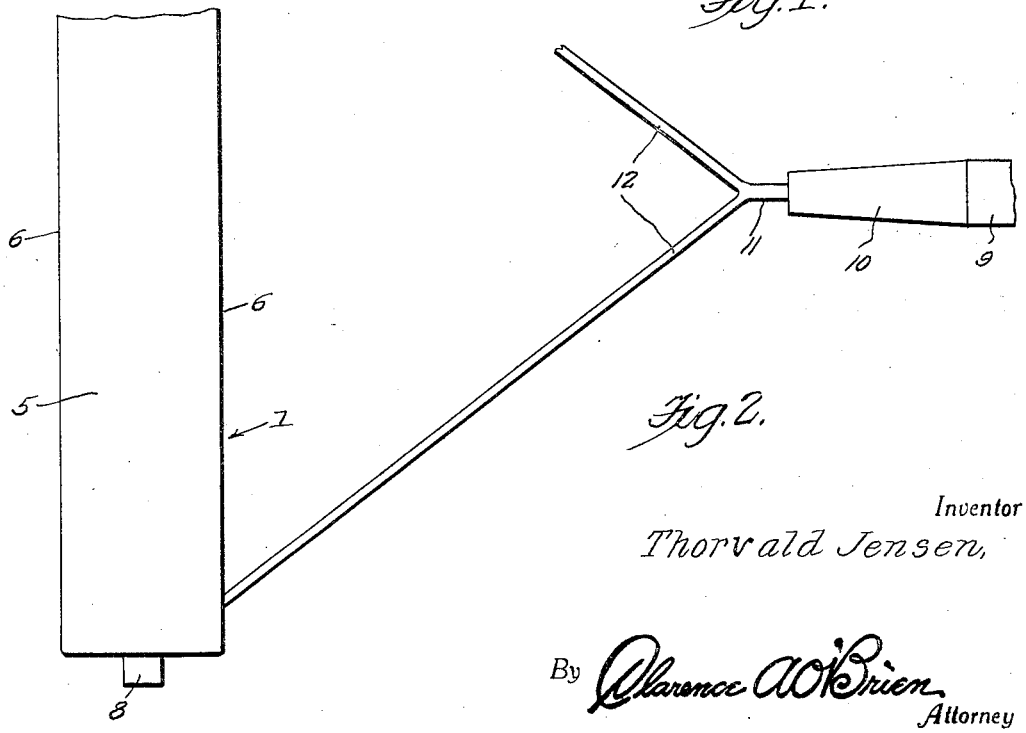
Figure 2 is a fragmentary view in top plan.
Figure 3:
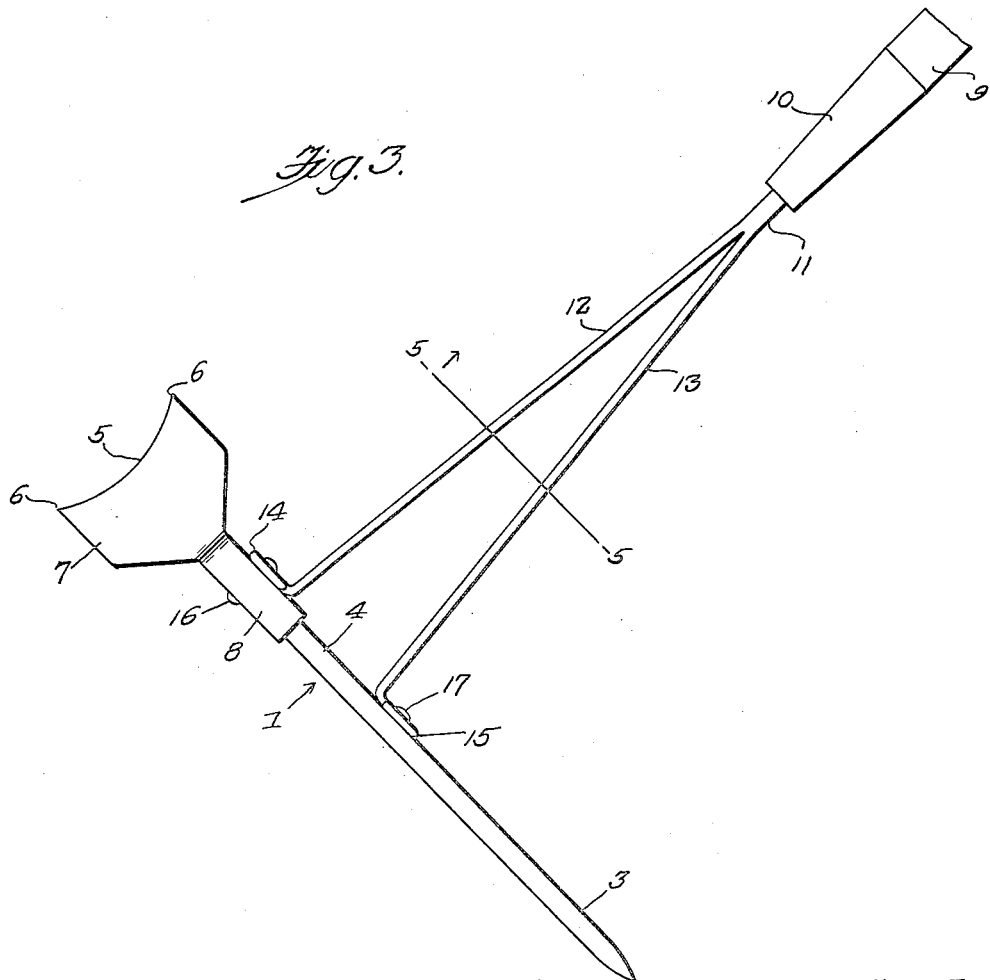
Figure 3 is a view in side elevation of the implement.
Figure 4:
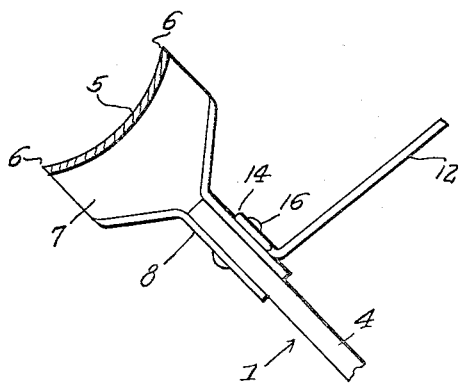
Figure 4 is a vertical sectional view taken substantially on the line 4—4 of Figure 1.
Figure 5:
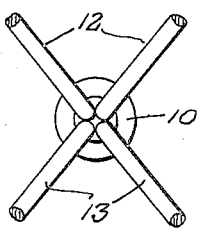
Figure 5 is a transverse sectional view, taken substantially on the line 5—5 of Figure 3.

Referring now to the drawings in detail, it will be seen that the embodiment of the invention which has been illustrated comprises a head which is designated generally by the reference numeral 1, said head being of suitable metal and comprising a transverse bar 2 from which the rake teeth 3 depend. The teeth 3 taper toward their free ends and terminate in points as illustrated to advantage in Figures 1 and 3 of the drawings.

Rising from the end portions of the bar 2 are arms 4 upon which is mounted a transverse substantially concavo-convex cutter 5 having both edges sharpened, as at 6. The cutter bar 5 is provided with downturned end portions 7 which terminate in socket members 8 of substantially U-shaped horizontal sections which receive the arms 4.

The reefrence numeral 9 designates a portion of a handle having a socketed end portion 10 which receives a shank 11. Extending from the shank 11 are upper and lower pairs of diverging arms 12 and 13 respectively which terminate in upwardly and downwardly directed eyes 14 and 15, respectively. The eyes 14 are in abutting engagement with one side of the socket members 8 and are anchored thereto by securing elements 16 which extend through said socket members and the arms 4 thus securing said arms in the socket members. The eyes 15 are engaged with the lower portions of the arms 4 adjacent the ends of the bar 2 and are secured, as at 17.

It will thus be seen that a garden implement has been provided which is adapted to function as a rake which, upon being inverted or reversed, may be used as a chopper or cutter for various purposes. The manner of mounting the cutter 5 in position and of attaching the head 1 to the handle 9 provides a very strong and durable structure, as is believed to be apparent.

It is believed that the many advantages of a garden implement constructed in accordance with the present invention will be readily understood, and although the preferred embodiment of the invention is as illustrated and described, it is to be understood that changes in the details of construction, and in the combination and arrangement of parts may be resorted to which will fall within the scope of the invention as claimed.

Having thus described my invention, what I claim as new is:

A garden implement comprising a head formed from a single blank of substantially flat metal and including a transverse bar, arms rising from the end portions of said bar, a cutter bar, of substantially concavo-convex transverse section, mounted at right angles to the head in vertically spaced relation to said head, flat downturned members on the ends of the cutter bar, the members terminating, at their lower end portions, in substantially U-shaped socket members positioned at right angles to said members, the arms being engaged in the socket members and secured therein, a handle, and means for mounting the head on the handle.

THORVALD JENSEN.